United States Patent [19]
Wilkinson et al.

[11] Patent Number: 6,126,219
[45] Date of Patent: Oct. 3, 2000

[54] UNDERBODY ASSEMBLY FOR MOTOR VEHICLES

[75] Inventors: Alan L. Wilkinson, W. Bloomfield; Yehia Harajli, Dearborn Heights; Norman H. Jewell, Dearborn; Karen Burns Mianzo, Plymouth; Stephen Louis Bruford, W. Bloomfield, all of Mich.

[73] Assignee: Ford Global Technologies, Inc., Dearborn, Mich.

[21] Appl. No.: 09/144,613

[22] Filed: Aug. 31, 1998

[51] Int. Cl.[7] ........................................................ B62C 3/00
[52] U.S. Cl. ......................... 296/26.01; 296/25; 296/204
[58] Field of Search ................................... 296/25, 26.01, 296/29, 184, 203.03, 204, 209

[56] References Cited

U.S. PATENT DOCUMENTS

| | | | |
|---|---|---|---|
| 4,509,790 | 4/1985 | Nagamoto et al. | 296/204 |
| 4,840,423 | 6/1989 | Maekawa | 296/194 |
| 4,847,972 | 7/1989 | Anderson et al. | 29/401.1 |
| 4,865,378 | 9/1989 | Filtri et al. | 296/197 |
| 5,035,462 | 7/1991 | Page et al. | 296/183 |
| 5,536,131 | 7/1996 | Behr | 414/495 |
| 5,653,494 | 8/1997 | Cleall et al. | 296/182 |
| 5,700,049 | 12/1997 | Shibata | 296/188 |
| 5,765,906 | 6/1998 | Iwatsuki et al. | 296/203 |
| 5,782,525 | 7/1998 | Honma et al. | 296/188 |
| 5,860,694 | 1/1999 | Seefried et al. | 296/203.03 |
| 5,921,618 | 7/1999 | Mori et al. | 296/188 |

*Primary Examiner*—D. Glenn Dayoan
*Assistant Examiner*—Paul Chenevert
*Attorney, Agent, or Firm*—David B. Kelley

[57] ABSTRACT

An underbody assembly for a motor vehicle includes a floorpan extending longitudinally and transversely. The underbody assembly also includes a side sill operatively connected to the floorpan to provide more than one underbody load floor height of the floorpan relative to body side assemblies of the motor vehicle.

20 Claims, 3 Drawing Sheets

UNDERBODY ASSEMBLY FOR MOTOR VEHICLES

BACKGROUND OF THE INVENTION

1. Field of the Invention

The present invention relates generally to bodies for motor vehicles and, more particularly, to an underbody assembly for a motor vehicle.

2. Description of the Related Art

It is known to provide an underbody for a motor vehicle. A motor vehicle may include a rear-wheel drive having the underbody at a load floor height to clear a differential carried by a rear axle of the rear-wheel drive. Also, a motor vehicle may include a front-wheel drive having the underbody at a load floor height which is lower to the ground because the rear axle does not carry the differential. As a result, motor vehicle manufacturers typically develop two different body structures for both front-wheel and rear-wheel drive motor vehicles to serve both light and heavy duty ends of the market.

One attempt to overcome this disadvantage is to use a common body structure and raise a ride height of the motor vehicle for the rear-wheel drive. However, this creates other disadvantages such as reduced interior roof height (and accompanying reduction in interior and volume) of the motor vehicle if an exterior roof height which will fit into standard parking garages is maintained. As a result, there is a need in the art to provide a modular platform design that allows the sharing of nearly all structural sheet metal parts and assembly tooling to achieve two underbody load floor heights for the same motor vehicle, in an automated assembly manufacturing operation.

SUMMARY OF THE INVENTION

Accordingly, the present invention is an underbody assembly for a motor vehicle. The underbody assembly includes a floorpan extending longitudinally and transversely and a side sill operatively connected to the floorpan to provide more than one underbody load floor height of the floorpan relative to body side assemblies of the motor vehicle.

One advantage of the present invention is that a new underbody assembly is provided for a motor vehicle. Another advantage of the present invention is that the underbody assembly provides two different underbody load floor heights to allow optimization of load space within a given exterior vehicle dimension for both front-wheel drive and rear-wheel drive configurations for a motor vehicle. Yet another advantage of the present invention is that the underbody assembly uses a modular platform design without increasing ride height or reducing interior roof height. Still another advantage of the present invention is that the underbody assembly optimizes package efficiency for both front-wheel and rear-wheel drive powertrain layouts without the need for two completely different body structures. A further advantage of the present invention is that the underbody assembly has a modular platform which can be constructed on the same body assembly line to minimize up-front investment and increase assembly plant flexibility.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
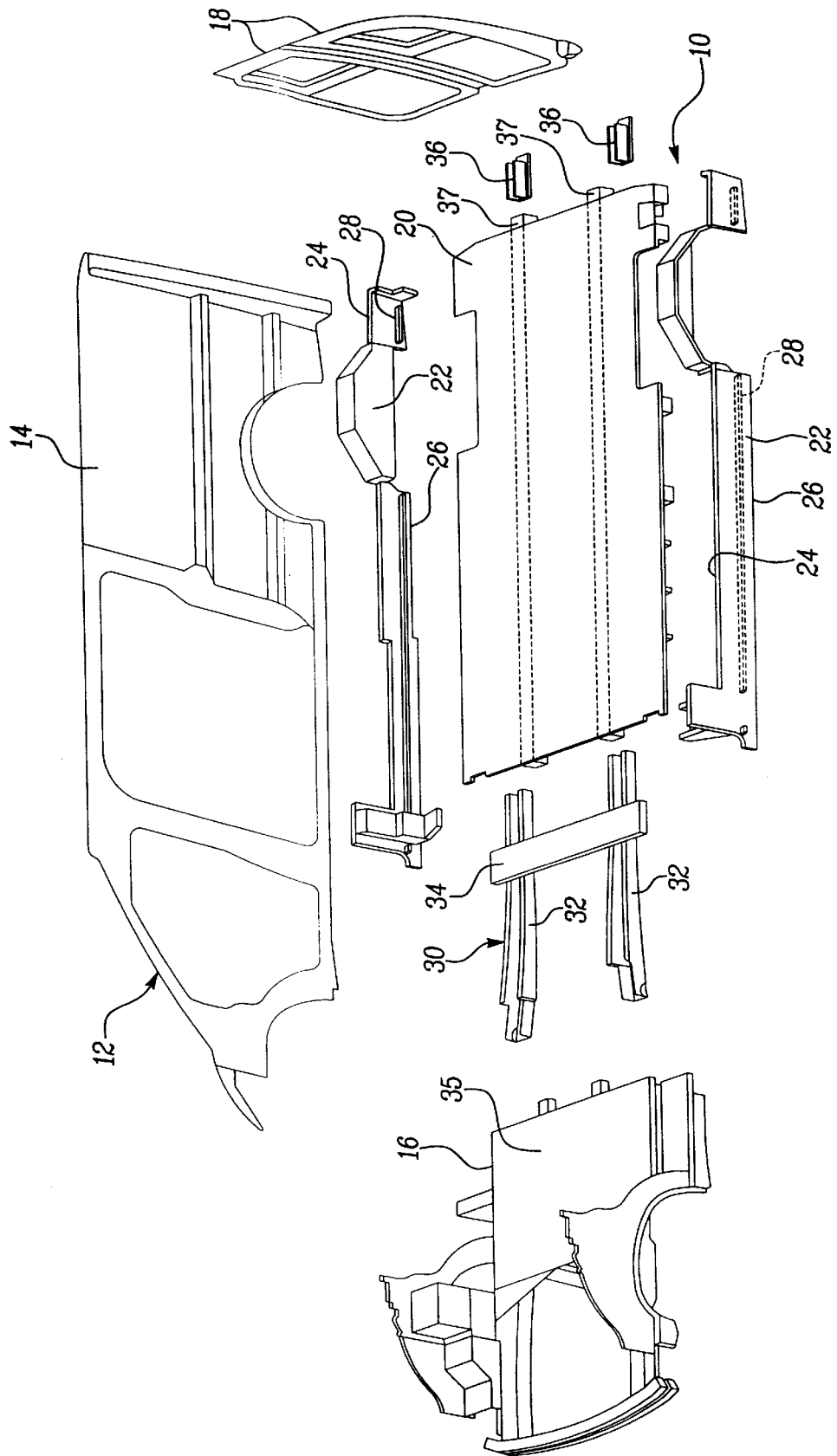
FIG. 1 is an exploded view of an underbody assembly, according to the present invention, having a high underbody load floor height for a motor vehicle.

Referring to the drawings and in particular FIG. 1, one embodiment of an underbody assembly 10, according to the present invention, is shown for a motor vehicle, generally indicated at 12. The motor vehicle 12 includes a pair of body side assemblies 14 operatively connected to sides of the underbody assembly 10. It should be appreciated that only one body side assembly 14 is illustrated.

The motor vehicle 12 includes a front end assembly 16 operatively connected to a forward or front end of the underbody assembly 10. The motor vehicle 12 also includes a pair of rear cargo doors 18 operatively adjoined to a rear or back end of the underbody assembly 10. It should be appreciated that the motor vehicle 12 includes a roof (not shown) and other closures (not shown) which are also common for the two load floor heights. It should also be appreciated that, except for the underbody assembly 10, the motor vehicle 12 is conventional and known in the art.

The underbody assembly 10 includes an underbody load floor or floorpan 20 extending longitudinally and transversely. The underbody assembly 10 also includes a side sill 22 extending longitudinally along each side of the floor pan 20. The side sill 22 has a top surface 24 and a bottom surface 26 and a ledge 28 extending longitudinally and disposed between the top surface 24 and the bottom surface 26. For a high underbody load height for a rear-wheel drive configuration of the motor vehicle 12 illustrated in FIGS. 1 and 3, the floorpan 20 is operatively connected to the top surface 24 of the side sills 22 by suitable means such as welding. It should be appreciated that the side sills 22 are used along the load floor to body side interface along the edges of the floorpan 20 to take up the different position of the floorpan 20 relative to the body side assemblies 14.

The underbody assembly 10 includes a transition structure, generally indicated at 30, operatively connected between the floorpan 20 and the front end assembly 16. The transition structure 30 includes a pair of side members 32 extending longitudinally and transversely spaced. The side members 32 are operatively connected to front rails (not shown) of the front end assembly 16 by suitable means such as welding. The transition structure 30 also includes a floorpan extension 34 extending transversely and disposed on an upper surface of the side members 32. The floorpan extension 34 is generally planar and operatively connected to the side members 32 by suitable means such as welding. It should be appreciated that the floorpan extension 34 is used to make a transition between the floorpan 20 and a front floor 35 of the front end assembly 16 (which is fixed at the same position for both the high and low underbody load floors forward of a B-pillar (not shown) to maintain the position of a driver of the motor vehicle 12). It should also be appreciated that the transition structure 30 is used to achieve the different underbody load floor heights for the high and low underbody load floors to accommodate the different heights of the rear relative to the front of the motor vehicle 12.

Figure 3:
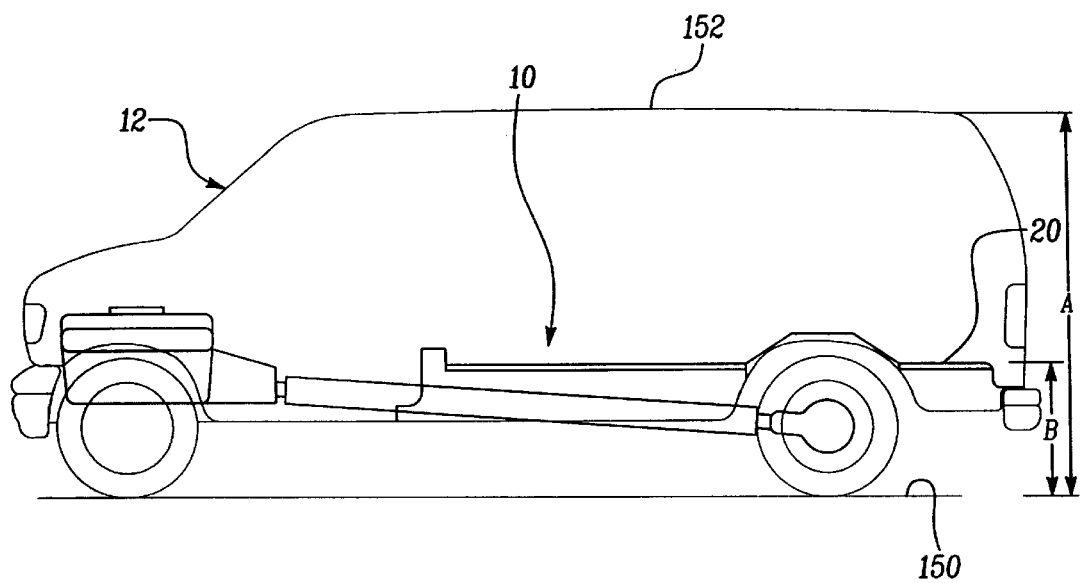
FIG. 3 is an elevational view of the motor vehicle of FIG. 1.

The underbody assembly 10 may include a pair of extensions 36 positioned on the bottom of the rear side members 37 connected to the floorpan 20 and a rear sill (not shown) for the high underbody load floor of FIGS. 1 and 3 to maintain the size of a rear door opening, allowing the use of the common rear doors 18. The extensions 36 extend longitudinally and are operatively connected to the rear side members 37 by suitable means such as welding. The extensions 36 allow the rear side members 37 to make a transition to the rear door opening.

Figure 2:
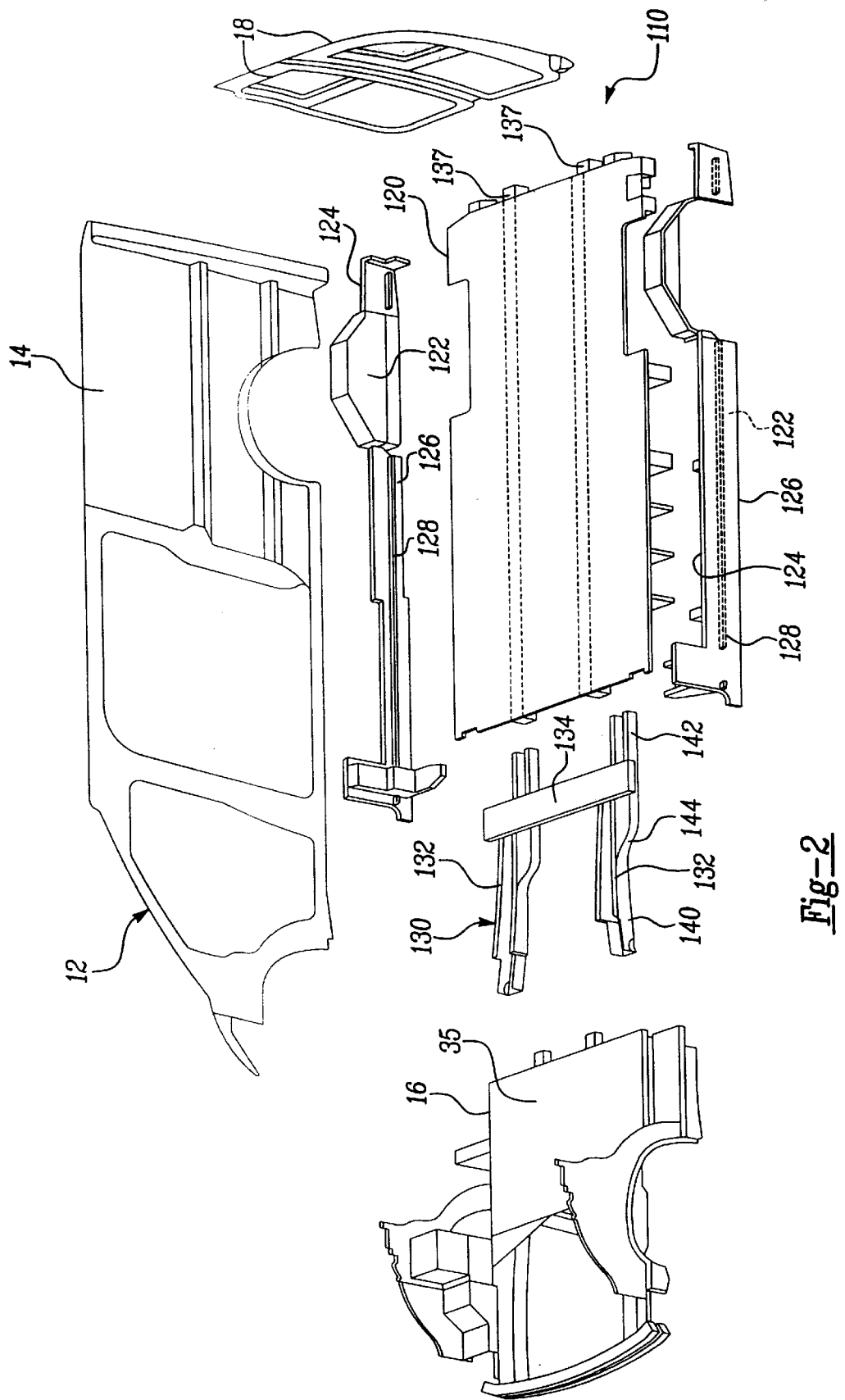
FIG. 2 is a view similar to FIG. 1 having a low underbody load floor height for the motor vehicle.

Referring to FIG. 2, an underbody assembly 110, according to the present invention, is shown for a low underbody load height for the motor vehicle 12. Like parts of the underbody assembly 10 have like reference numerals increased by one hundred (100). The underbody assembly 110 has the floorpan 120 operatively connected to the ledge 128 of the side sill 122 by suitable means such as welding. The underbody assembly 110 also includes the transition structure 130. The transition structure 130 includes the side members 132 extending longitudinally. The side members 132 having an upper portion 140, a lower portion 142 and a transition portion 144 to accommodate a difference in height between the upper portion 140 and lower portion 142. The transition structure 130 also includes the floorpan extension 134 extending transversely and disposed on an upper surface of the lower portion 142 of the side members 132 and operatively connected thereto by suitable means such as welding. It should be appreciated that the floorpan extension 134 is used to make a transition between the floorpan 120 and the front floor 35.

Referring to FIG. 3, the underbody assembly 10 is illustrated for a high underbody load floor height for a rear-wheel drive motor vehicle 12. The motor vehicle 12 has an external height "A" measured from a ground 150 to a roof line 152 of the motor vehicle 12. The underbody assembly 10 is at an underbody load floor height "B" measured from the ground 150 to the floorpan 20 such that the underbody assembly 10 clears a differential (not shown) on a rear axle of the motor vehicle 12. It should be appreciated that the dimension "B" is less than the dimension "A". It should also be appreciated that a higher load floor is required to package the driveline for rear wheel drive applications.

Figure 4:
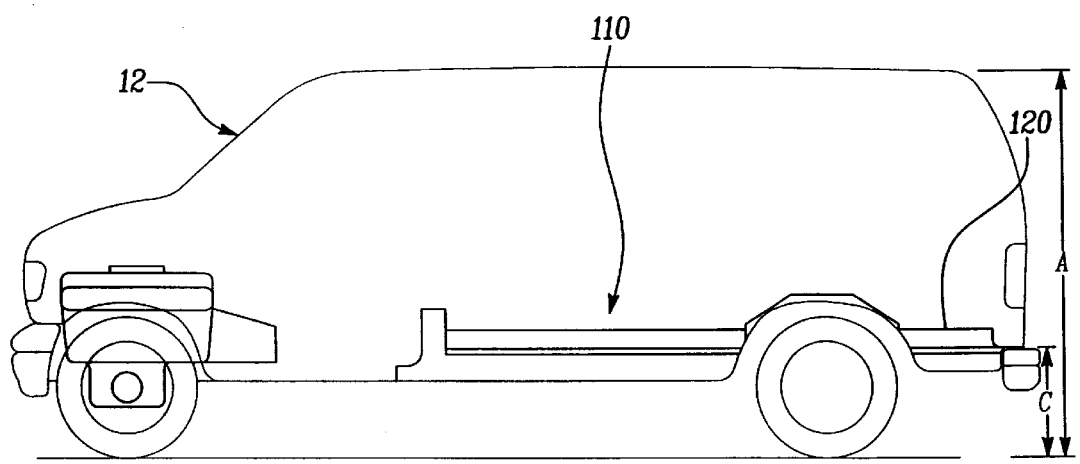
FIG. 4 is an elevational view of the motor vehicle of FIG. 2.

Referring to FIG. 4, the underbody assembly 110 is illustrated for a low underbody load floor height for a front-wheel drive motor vehicle 12. The motor vehicle 12 again has the same external height "A", but the underbody assembly 110 is at an underbody load floor height "C" measured from the ground 150 to the floorpan 120. The dimension "C" is less than the dimension "B". It should be appreciated that the low underbody load floor height is used on front wheel drive applications to achieve a lower load floor to ease loading and unloading and to achieve additional load volume within the external height "A" of the motor vehicle 12.

Accordingly, the underbody assembly 10,110 achieves multiple underbody heights with a common set of body side assemblies 14. The underbody assembly 10 may be stretched lengthwise and located up and down relative to the body side assemblies 14. The underbody assembly 10 permits the location of the common underbody structure at different positions within a common set of body side assemblies 14 to maximize load space efficiency for both front-wheel and rear-wheel drive applications, eliminating the need for two unique platforms.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An underbody assembly for a motor vehicle comprising:
    a floorpan extending longitudinally and transversely; and
    a side sill operatively connected at one of a plurality of vertically spaced horizontal surfaces to said floorpan to provide at each of said plurality of surfaces more than one underbody load floor height of said floorpan relative to body side assemblies of the motor vehicle.

2. An underbody assembly for a motor vehicle comprising:
    a floorpan extending longitudinally and transversely;
    a side sill operatively connected at one of a plurality of vertically spaced horizontal surfaces to said floorpan to provide at each of said plurality of surfaces more than one underbody load floor height of said floorpan relative to body side assemblies of the motor vehicle; and
    a transition structure to transition between said floorpan and a front body assembly of the motor vehicle.

3. An underbody assembly as set forth in claim 2 wherein said transition structure comprises a pair of side members extending longitudinally and operatively connected to said floorpan and the front body assembly.

4. An underbody assembly as set forth in claim 3 wherein said transition structure includes a floorpan extension operatively connected to said side members to transition between said floorpan and a front floor of the front body assembly.

5. An underbody assembly as set forth in claim 4 wherein each of said side members comprises an upper portion, a lower portion and a transition portion to accommodate a difference in height between said upper portion and said lower portion.

6. An underbody assembly for a motor vehicle comprising:
    a floorpan extending longitudinally and transversely;
    a side sill operatively connected to said floorpan to provide more than one underbody load floor height of said floorpan relative to body side assemblies of the motor vehicle; and
    wherein said side sill extends longitudinally and has a top surface, said floorpan being connected to said top surface.

7. An underbody assembly for a motor vehicle comprising:
    a floorpan extending longitudinally and transversely;
    a side sill operatively connected to said floorpan to provide more than one underbody load floor height of said floorpan relative to body side assemblies of the motor vehicle; and
    wherein said side sill extends longitudinally and has a top surface, a bottom surface and a ledge disposed between said top surface and said bottom surface, said floorpan being connected to said ledge.

8. An underbody assembly for a motor vehicle comprising:
    a floorpan extending longitudinally and transversely;
    a side sill operatively connected to said floorpan to provide more than one underbody load floor height of said floorpan relative to body side assemblies of the motor vehicle; and
    a pair of extensions disposed between rear side members and a pair of rear doors of the motor vehicle.

9. An underbody assembly as set forth in claim 8 wherein each of said extensions is operatively connected to said rear side members and extend longitudinally.

10. A motor vehicle comprising:

a pair of body side assemblies extending longitudinally and spaced transversely; and an underbody assembly operatively connected at one of a plurality of vertically spaced horizontal surfaces to said body side assemblies to provide at each of said plurality of surfaces more than one underbody load floor height relative to said body side assemblies for said motor vehicle.

11. A motor vehicle as set forth in claim 10 wherein said underbody assembly comprises a floorpan extending longitudinally and transversely and a side sill operatively connected to said floorpan.

12. A motor vehicle comprising:

a pair of body side assemblies extending longitudinally and spaced transversely;

an underbody assembly operatively connected at one of a plurality of vertically spaced horizontal surfaces to said body side assemblies to provide at each of said plurality of surfaces more than one underbody load floor height relative to said body side assemblies for said motor vehicle;

wherein said underbody assembly comprises a floorpan extending longitudinally and transversely and a side sill operatively connected to said floorpan; and a front body assembly; and a transition structure to transition between said floorpan and said front body assembly of said motor vehicle.

13. A motor vehicle as set forth in claim 12 wherein said transition structure includes a floorpan extension operatively connected to said side members to transition between said floorpan and a front floor of said front body assembly.

14. A motor vehicle as set forth in claim 12 wherein said transition structure comprises a pair of side members extending longitudinally and operatively connected to said floorpan and said front body assembly.

15. A motor vehicle as set forth in claim 13 wherein each of said side members comprises an upper portion, a lower portion and a transition portion to accommodate a difference in height between said upper portion and said lower portion.

16. A motor vehicle comprising:

a pair of body side assemblies extending longitudinally and spaced transversely;

an underbody assembly operatively connected to said body side assemblies to provide more than one underbody load floor height relative to said body side assemblies for said motor vehicle;

wherein said underbody assembly comprises a floorpan extending longitudinally and transversely and a side sill operatively connected to said floorpan; and wherein said side sill extends longitudinally and has a top surface, said floorpan being connected to said top surface.

17. A motor vehicle comprising:

a pair of body side assemblies extending longitudinally and spaced transversely;

an underbody assembly operatively connected to said body side assemblies to provide more than one underbody load floor height relative to said body side assemblies for said motor vehicle;

wherein said underbody assembly comprises a floorpan extending longitudinally and transversely and a side sill operatively connected to said floorpan; and wherein said side sill extends longitudinally and has a top surface, a bottom surface and a ledge disposed between said top surface and said bottom surface, said floorpan being connected to said ledge.

18. A motor vehicle comprising:

a pair of body side assemblies extending longitudinally and spaced transversely;

an underbody assembly operatively connected to said body side assemblies to provide more than one underbody load floor height relative to said body side assemblies for said motor vehicle;

wherein said underbody assembly comprises a floorpan extending longitudinally and transversely and a side sill operatively connected to said floorpan; and a pair of extensions disposed between said floorpan and a pair of rear doors of said motor vehicle.

19. A motor vehicle as set forth in claim 18 wherein each of said extensions is operatively connected to said rear side members and extend longitudinally.

20. A motor vehicle comprising:

a pair of body side assemblies extending longitudinally and spaced transversely;

a front body assembly having a front floor;

a floorpan extending longitudinally and transversely;

a side sill extending longitudinally and having a top surface, a bottom surface and a ledge disposed between said top surface and said bottom surface, said floorpan being connected to either one of said top surface and said ledge to provide more than one underbody load floor height of said floorpan relative to said body side assemblies;

a transition structure to transition between said floorpan and said front body assembly;

said transition structure comprising a pair of side members extending longitudinally and operatively connected to said floorpan and said front body assembly; and said transition structure including a floorpan extension operatively connected to said side members to transition between said floorpan and said front floor of said front body assembly.

\* \* \* \* \*